(12) United States Patent
Koyama et al.

(10) Patent No.: US 10,440,370 B2
(45) Date of Patent: Oct. 8, 2019

(54) APPARATUS AND METHOD FOR IMAGE CODING, AND NON-TRANSITORY COMPUTER-READABLE STORAGE MEDIUM

(71) Applicant: FUJITSU LIMITED, Kawasaki-shi, Kanagawa (JP)

(72) Inventors: Junpei Koyama, Shibuya (JP); Kimihiko Kazui, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 312 days.

(21) Appl. No.: 15/431,089

(22) Filed: Feb. 13, 2017

(65) Prior Publication Data
US 2017/0264909 A1  Sep. 14, 2017

(30) Foreign Application Priority Data
Mar. 14, 2016 (JP) ................... 2016-049115

(51) Int. Cl.
*H04N 7/12* (2006.01)
*H04N 19/182* (2014.01)
(Continued)

(52) U.S. Cl.
CPC ......... *H04N 19/182* (2014.11); *H04N 19/593* (2014.11); *H04N 19/93* (2014.11); *G09G 5/06* (2013.01); *G09G 2340/02* (2013.01)

(58) Field of Classification Search
CPC .... H04N 19/176; H04N 19/593; H04N 19/70; H04N 19/182; H04N 19/186; H04N 19/50; G06T 9/50; G06T 9/00
(Continued)

(56) References Cited

U.S. PATENT DOCUMENTS 9,986,248 B2 * 5/2018 Pu ..................... H04N 19/593
2014/0301475 A1 * 10/2014 Guo ..................... H04N 19/50
375/240.24
(Continued)

FOREIGN PATENT DOCUMENTS

JP  11-88700  3/1999
JP  2000-125111  4/2000

OTHER PUBLICATIONS

JCTVC-51005, Rajan Joshi et al., "High Efficiency Video Coding (HEVC) Screen Content Coding: Draft 2", Joint Collaborative Team on Video Coding (JCT-VC) of ITU-T SG16 WP3 and ISO/IEC JTC 1/SC 29/WG 11, Jun. 30-Jul. 9, 2014, pp. 1-366.
(Continued)

*Primary Examiner* — Gims S Philippe
(74) *Attorney, Agent, or Firm* — Staas & Halsey LLP

(57) ABSTRACT

An apparatus for image coding includes a processor to: execute a determining process that includes, when a specific entry included in a first palette for use in coding a first block in a coding-target image is not an entry candidate for a second palette for use in coding a second block to be coded after the first block, determining an entry to be included in the second palette based on a first index indicating a code amount to be generated when the specific entry is to be included in the second palette and a second index indicating a code amount to be generated when the specific entry is not to be included in the second palette; execute a generating process that includes generating the second palette including the entry determined in the determining process; and execute a palette coding process that includes coding the second block by the second palette.

18 Claims, 15 Drawing Sheets

(51) Int. Cl.
*H04N 19/593* (2014.01)
*H04N 19/93* (2014.01)
*G09G 5/06* (2006.01)

(58) Field of Classification Search
USPC ..................................... 375/240.01–240.29
See application file for complete search history.

(56) References Cited

U.S. PATENT DOCUMENTS

| | | | |
|---|---|---|---|
| 2015/0016501 A1* | 1/2015 | Guo ..................... | G06T 9/00 375/240.02 |
| 2015/0373325 A1* | 12/2015 | Karczewicz ......... | H04N 19/593 375/240.13 |
| 2016/0309172 A1* | 10/2016 | Laroche ............... | H04N 19/593 |
| 2016/0316214 A1* | 10/2016 | Gisquet ................ | G09G 5/06 |
| 2017/0054990 A1* | 2/2017 | Itoh ..................... | H04N 19/186 |
| 2017/0347114 A1* | 11/2017 | Lee ...................... | H04N 19/50 |

OTHER PUBLICATIONS

JCTVC-51002, K. McCann et al., "High Efficiency Video Coding (HEVC) Test Model 16 (HM 16) Improved Encoder Description", Joint Collaborative Team on Video Coding (JCT-VC) of ITU-T SG16 WP3 and ISO/IEC JTC1/SC29/WG11, Oct. 17-Oct. 24, 2014, pp. 1-54.

\* cited by examiner

FIG. 2

| | Descriptor |
|---|---|
| palette_coding( x0, y0, nCbS ) { | |
|   palettePredictionFinished = 0 | |
|   NumPredictedPaletteEntries = 0 | |
|   for( predictorEntryIdx = 0; predictorEntryIdx < PredictorPaletteSize &&<br>    !palettePredictionFinished && NumPredictedPaletteEntries < palette_max_size;<br>    predictorEntryIdx++ ) { | |
|     palette_predictor_run | ae(v) |
|     if( palette_predictor_run != 1 ) { | |
|       if( palette_predictor_run > 1 ) | |
|         predictorEntryIdx += palette_predictor_run − 1 | |
|       PalettePredictorEntryReuseFlags[ predictorEntryIdx ] = 1 | |
|       NumPredictedPaletteEntries++ | |
|     } else | |
|       palettePredictionFinished = 1 | |
|   } | |
|   if( NumPredictedPaletteEntries < palette_max_size ) | |
|     num_signalled_palette_entries | ae(v) |
|   numComps = ( ChromaArrayType == 0 ) ? 1 : 3 | |
|   for( cIdx = 0; cIdx < numComps; cIdx++ ) | |
|     for( i = 0; i < num_signalled_palette_entries; i++ ) | |
|       new_palette_entries[ cIdx ][ i ] | ae(v) |
| --- Snip --- | |

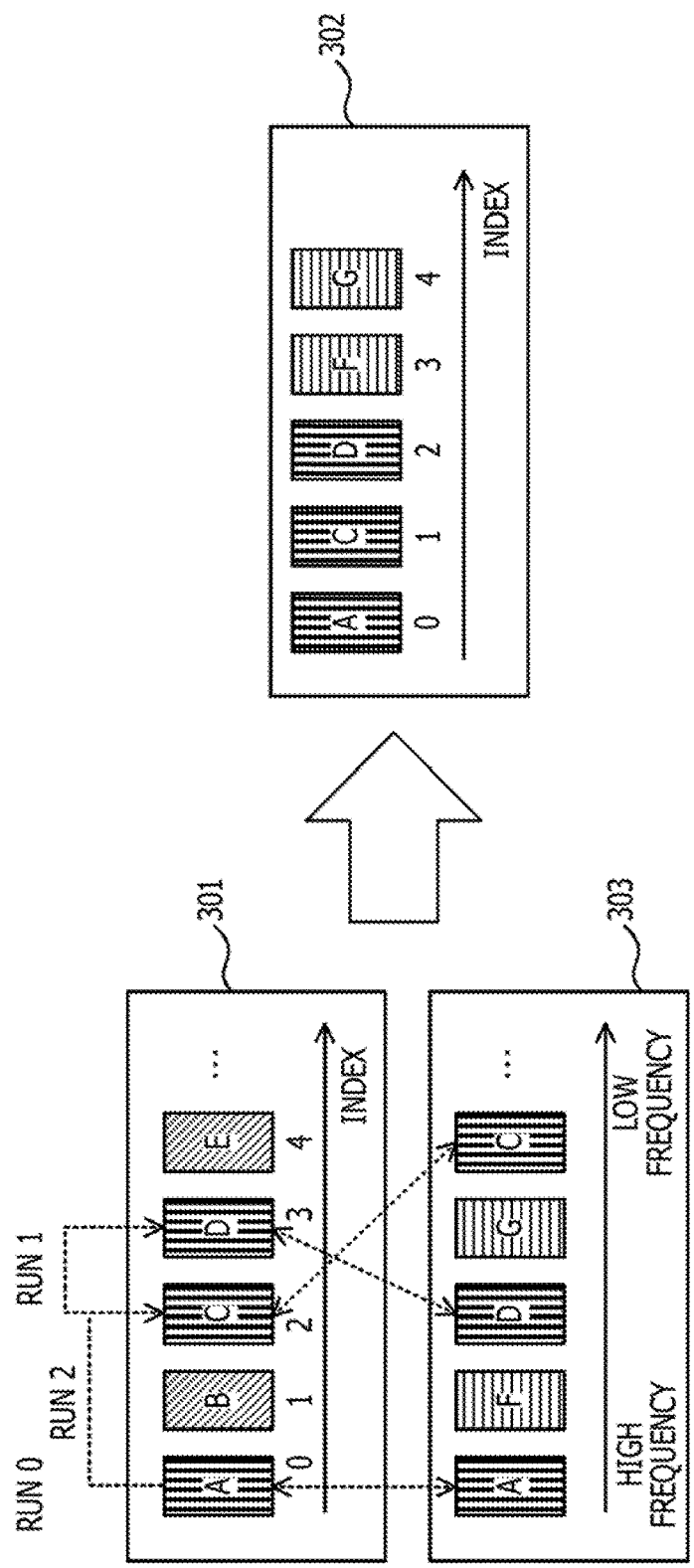

FIG. 10

| prefixVal | Bin string | | | | | |
|---|---|---|---|---|---|---|
| 0 | 0 | | | | | |
| 1 | 1 | 0 | | | | |
| 2 | 1 | 1 | 0 | | | |
| 3 | 1 | 1 | 1 | 0 | | |
| 4 | 1 | 1 | 1 | 1 | 0 | |
| 5 | 1 | 1 | 1 | 1 | 1 | 0 |
| ... | | | | | | |
| binIdx | 0 | 1 | 2 | 3 | 4 | 5 |

FIG. 11

| Bit string | codeNum |
|---|---|
| 1 | 0 |
| 010 | 1 |
| 011 | 2 |
| 00100 | 3 |
| 00101 | 4 |
| 00110 | 5 |
| 00111 | 6 |
| 0001000 | 7 |
| 0001001 | 8 |
| 0001010 | 9 |
| ... | ... |

APPARATUS AND METHOD FOR IMAGE CODING, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2016-049115, filed on Mar. 14, 2016, the entire contents of which are incorporated herein by reference.

FIELD

The embodiment discussed herein is related to an apparatus, a method, and a non-transitory computer-readable storage medium.

BACKGROUND

Moving picture data often has an enormous amount of data. Thus, when transmitted from a transmitting device to a receiving device or when stored in a storage device, the moving picture data may be compressed and coded.

As typical moving picture coding standards, Moving Picture Experts Group phase 2 (MPEG-2), MPEG-4, and H.264 MPEG-4 Advanced Video Coding (MPEG-4 AVC/H.264) have been known. These moving picture coding standards have been formulated by International Organization for Standardization/International Electrotechnical Commission (ISO/IEC).

The above-described moving picture coding standards adopt two coding schemes, that is, inter prediction coding and intra prediction coding. Inter prediction coding is a coding scheme of coding a coding-target picture by using coded picture information. Intra prediction coding is a coding scheme of coding a coding-target picture by using only information the coding-target picture has.

In January, 2013, a next-generation moving picture coding standard called High Efficiency Video Coding (HEVC) was formulated by an organization called Joint Collaborative Team on Video Coding (JCTVC). JCTVC is an organization operated jointly by International Telecommunication Union Telecommunication Standardization Sector (ITU-T) and ISO/IEC.

HEVC achieves double the coding efficiency of H.264 by introducing a new filter called a sample adaptive offset (SAO) and a tool that was difficult to be implemented due to limitations of hardware when H.264 was formulated.

Furthermore, JCTVC has formulated Screen Content Coding (SCC), which is a coding standard for screen contents, as an extension of HEVC. SCC is a coding standard for coding artificial video on a desktop screen of a personal computer (PC) or the like. SCC is expected as a coding standard suitable in future for use in, for example, compressing video transmitted from a server on cloud.

SCC aims at handling artificial video on a screen of a PC or the like, and video as a compression target includes video for medical purposes, video of computer aided design (CAD), and so forth. Thus, SCC includes a tool in consideration of an RGB color space, 4:4:4 color space, and so forth. These videos have a higher spatial correlation among color components, compared with natural pictures, and also the number of colors for use is often limited. Therefore, the tool added in SCC achieves an improvement in coding efficiency by using such video characteristics.

Typical tools added in SCC include cross component prediction (CCP), adaptive color transform (ACT), palette coding, and so forth. CCP is a technique of reducing prediction errors by using a correlation between prediction errors of each color component, and ACT is a technique of reducing the correlation among color components by applying, for example, transformation from a YCoCg color space into an RGB color space, to prediction errors.

Palette coding is a technique of reducing a code amount by representing a color component frequently appearing in video by an index and coding this index. For example, when each color component in a YUV color space is represented by eight bits, the code amount for representing one color is simply 24 bits in total in normal coding.

Meanwhile, in palette coding, if there is a frequently-appearing color component, an index is provided to that color component, and the index is coded in place of the color component. For example, if the total number of indexes is 256, which are representable by eight bits, the code amount for representing one color is simply eight bits. Therefore, the amount of information after coding is reduced from 24 bits to eight bits.

As a matter of course, this calculation of a code amount is a simplified example. In actual coding, orthogonal transformation and arithmetic coding are performed, and therefore a different calculation result is obtained. However, as a basic way of thinking, a color is represented by a small number of indexes in place of a color component as it is, thereby making it possible to reduce the amount of information.

Artificial video handled by SCC tends to be such that the same color is repeatedly used and the types of color used are further limited, compared with natural pictures. In palette coding, a small number of frequently-appearing colors are each represented by an index with a small code amount, thereby reducing the amount of information and improving coding efficiency.

As examples of the related art, JCTVC-V1005, "High Efficiency Video Coding (HEVC) Screen Content Coding: Draft 5", Joint Collaborative Team on Video Coding (JCT-VC) of ITU-T SG16 WP3 and ISO/IEC JTC1/SC29/WG11, October 2015 is known. And also, JCTVC-S1002, "High Efficiency Video Coding (HEVC) Test Model 16 (HM 16) Improved Encoder Description", Joint Collaborative Team on Video Coding (JCT-VC) of ITU-T SG16 WP3 and ISO/IEC JTC1/SC29/WG11, February-October 2014 is known.

SUMMARY

According to an aspect of the invention, an apparatus for image coding, the apparatus comprising: a memory; and a processor coupled to the memory and configured to execute a determining process that includes when a specific entry included in a first palette for use in coding a first block in a coding-target image is not an entry candidate for a second palette for use in coding a second block to be coded after the first block, determining an entry to be included in the second palette based on a first index indicating a code amount to be generated when the specific entry is to be included in the second palette and a second index indicating a code amount to be generated when the specific entry is not to be included in the second palette, execute a generating process that includes generating the second palette including the entry determined in the determining process, and execute a palette coding process that includes coding the second block by using the second palette.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram of syntaxes with regard to palette decoding;

FIG. 3 is a diagram of a palette generating process;

FIG. 10 is a diagram of code strings obtained by truncated unary binarization;

FIG. 11 is a diagram of code strings obtained by exponential Golomb coding;

DESCRIPTION OF EMBODIMENT

In the conventional palette coding technique, as a palette generating process, the color of an entry included in a palette for a immediately-previously coded block and colors included in a coding-target block are compared in a coding-target image. When the same color as that of the coding-target block is present in the immediately-preceding palette, the entry in the immediately-preceding palette is reused. However, if an entry to be reused is determined based only on a local correlation between blocks, a problem may arise in which the code amount of the palette is increased to decrease coding efficiency.

This problem may arise not only in palette coding on a screen content image but also in palette coding on another image with a small variation of pixel values.

As one aspect of the present embodiment, provided are solutions for being able to improve coding efficiency in palette coding.

In the following, the embodiment is described in detail with reference to the drawings. First, block division in HEVC is described. In HEVC, blocks of four types called a coding tree unit (CTU), a coding unit (CU), a prediction unit (PU), and a transform unit (TU) are provided. The CTU is a block as a root node when block division is regarded to have a tree structure, and corresponds to a maximum block size that may be taken by the CU.

The CU is a block serving as a leaf node in that tree structure, and is a unit by which a prediction mode such as inter prediction or intra prediction is determined. That is, in the CU, predictions of different types such as inter prediction and intra prediction do not coexist.

The PU is a block obtained by further dividing the CU, and is a unit by which an optimum prediction method is selected from among prediction modes determined for the CU. For example, a prediction direction is selected in intra prediction, and a motion vector is selected in inter prediction. Also, the PU may not have a square shape, and may be a rectangle of 2N×N, N×2N, or the like when the size of one side of the CU is taken as 2N. The TU is a block obtained by further dividing the CU, and is a unit by which orthogonal transformation is performed. The size of the TU is unrelated to the size of the PU.

Palette coding is performed in units of CUs, and a palette for use in coding is generated for each CU. Then, a color represented by a pixel value of each pixel in the CU is specified by an index registered in the palette, and the palette and the index of each pixel are coded. The palette may be referred to as a palette table.

Figure 1:
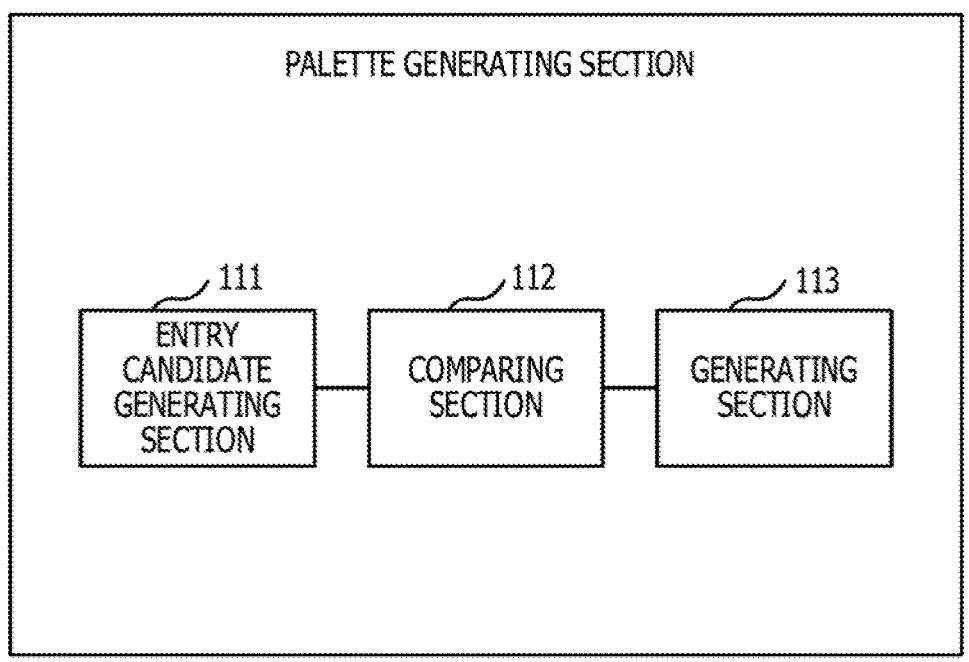
FIG. 1 is a diagram of the structure of a palette generating section.

FIG. 1 depicts an example of the structure of a palette generating section provided to a moving picture coding apparatus. A palette generating section 101 of FIG. 1 includes an entry candidate generating section 111, a comparing section 112, and a generating section 113.

The entry candidate generating section 111 extracts, from among pixel values of a coding-target CU, a candidate as an entry (entry candidate) to be registered in a palette for the coding-target CU, and outputs the entry candidate to the comparing section 112. For example, the entry candidate generating section 111 generates a frequency histogram of colors included in the coding-target CU, and sequentially extracts a predetermined number of colors in descending order of frequency as entry candidates.

The comparing section 112 compares an entry candidate outputted from the entry candidate generating section 111 and entries included in a palette fed back from the generating section 113. The fed-back palette is a palette for a CU coded immediately before the coding-target CU. Then, the comparing section 112 outputs, to the generating section 113, a comparison result as to whether the same color as that of the entry candidate is included in the fed-back palette.

The generating section 113 generates, based on the comparison result, a palette for the coding-target CU including an entry to be left on the palette and an entry to be newly added to the palette. The newly-added entry includes a pixel value representing a color and an index indicating that color.

The moving picture coding apparatus codes the coding-target CU by using the generated palette for the coding-target CU, and transmits the coded CU and the palette to a moving picture decoding apparatus. The moving picture decoding apparatus receives the coded CU and the palette from the moving picture coding apparatus, and decodes the coded CU by using the palette.

FIG. 2 depicts an example of syntaxes with regard to palette decoding. In palette coding, by referring to a palette for an immediately-previously decoded CU, the amount of information for representing a palette is reduced. In this case, a palette is decoded through a procedure as described below.

The moving picture decoding apparatus refers to the palette for the immediately-previously decoded CU to search for an entry to be reused. Which index-indicated color to be reused is specified by a run representing a distance between entries in the palette for the immediately-previously decoded CU. A syntax corresponding to a search for an entry to be reused is palette_predictor_run. By this search, an entry to be reused is determined. When palette_predictor_run is 1, a search for an entry to be reused is aborted.

Next, the moving picture decoding apparatus obtains the number of entries to be newly added to the palette for a decoding-target CU (coded CU) from num_signalled_palette_entries, and decodes pixel values of new entries as many as that number. A syntax corresponding to the new entries is new_palette_entries[cIdx][i]. Here, variables cIdx and i represent an index of a color component such as a luminance or color difference and an index for a loop for decoding the entries to be newly added to the palette for the decoding-target CU, respectively.

By the procedure as described above, the palette for the decoding-target CU is determined. Then, the moving picture decoding apparatus decodes the decoding-target CU by using the palette. When a pixel in the decoding-target CU represents an index that is present in the palette, the moving picture decoding apparatus obtains from the palette a pixel value specified by that index. On the other hand, when a pixel in the decoding-target CU represents a color that is not present in the palette, the moving picture decoding apparatus newly decodes a pixel value by taking palette_escape_val.

In JCTVC-V1005, "High Efficiency Video Coding (HEVC) Screen Content Coding: Draft 5", Joint Collaborative Team on Video Coding (JCT-VC) of ITU-T SG16 WP3 and ISO/IEC JTC1/SC29/WG11, October 2015, a palette generating method in a moving picture coding apparatus is described. According to this palette generating method, when a palette for a coding-target CU is generated, a pixel value of an entry in a palette for an immediately-previously coded CU and a pixel value of a pixel in the coding-target CU are compared. Then, when the same color as that of a pixel of the coding-target CU is present in the immediately-preceding palette, a run indicating the position of that entry is specified, thereby reusing the entry in the immediately-preceding palette. Then, another color with high frequency in the coding-target CU is also added to the palette.

FIG. 3 depicts an example of a palette generating process by the palette generating method as described above. By using entries in a palette 301 for an immediately-previously coded CU, the palette generating section 101 of FIG. 1 generates a palette 302 for a coding target CU. In the palette 301, a plurality of colors including a color A to a color E are registered.

The entry candidate generating section 111 generates a frequency histogram 303 of the colors in the coding-target CU, and sequentially extracts a predetermined number of colors in the frequency histogram 303 in descending order of frequency as entry candidates. The comparing section 112 compares the color of an entry candidate and the colors registered in the palette 301.

In this example, the color A, the color F, the color D, a color G, and the color C included in the frequency histogram 303 are extracted as entry candidates. Among these, the color A is the same as the color of an entry indicated by an index "0" in the palette 301, and therefore this entry is reused in the palette 302. Thus, the generating section 113 codes a run "0" indicating the entry with the index "0" in the palette 301 and registers the coded run at the position of an index "0" in the palette 302.

Similarly, the color C and the color D included in the frequency histogram 303 are the same as the colors of entries indicated by an index "2" and an index "3" in the palette 301, and therefore these entries are reused in the palette 302.

Thus, the generating section 113 codes a run "2" representing a distance between the entry with the index "0" and the entry with the index "2" in the palette 301, and registers the coded run at the position of an index "1" in the palette 302. Then, the generating section 113 codes a run "1" representing a distance between the entry with the index "2" and the entry with the index "3" in the palette 301, and registers the coded run at the position of an index "2" in the palette 302.

Next, the generating section 113 adds the remaining entry candidates included in the frequency histogram 303 to the palette 302 as new entries, and directly codes the entries by using pixel values. Here, after coding the number of the remaining entry candidates, the generating section 113 allocates serial indexes in descending order of frequency, and codes pixel values representing the colors and the allocated indexes. With this, the color F is registered at the position of an index "3", and the color G is registered at the position of an index "4".

According to the palette generating process as described above, an entry of a color frequently appearing in an image is continuously left without being removed from the palette. Therefore, as a plurality of CUs are coded, a gradually smaller index is allocated. Then, since an index difference between entries of frequently-appearing colors becomes smaller, a run representing a distance between entries becomes smaller. Thus, the code amount for coding an entry to be reused is decreased.

Figure 4:
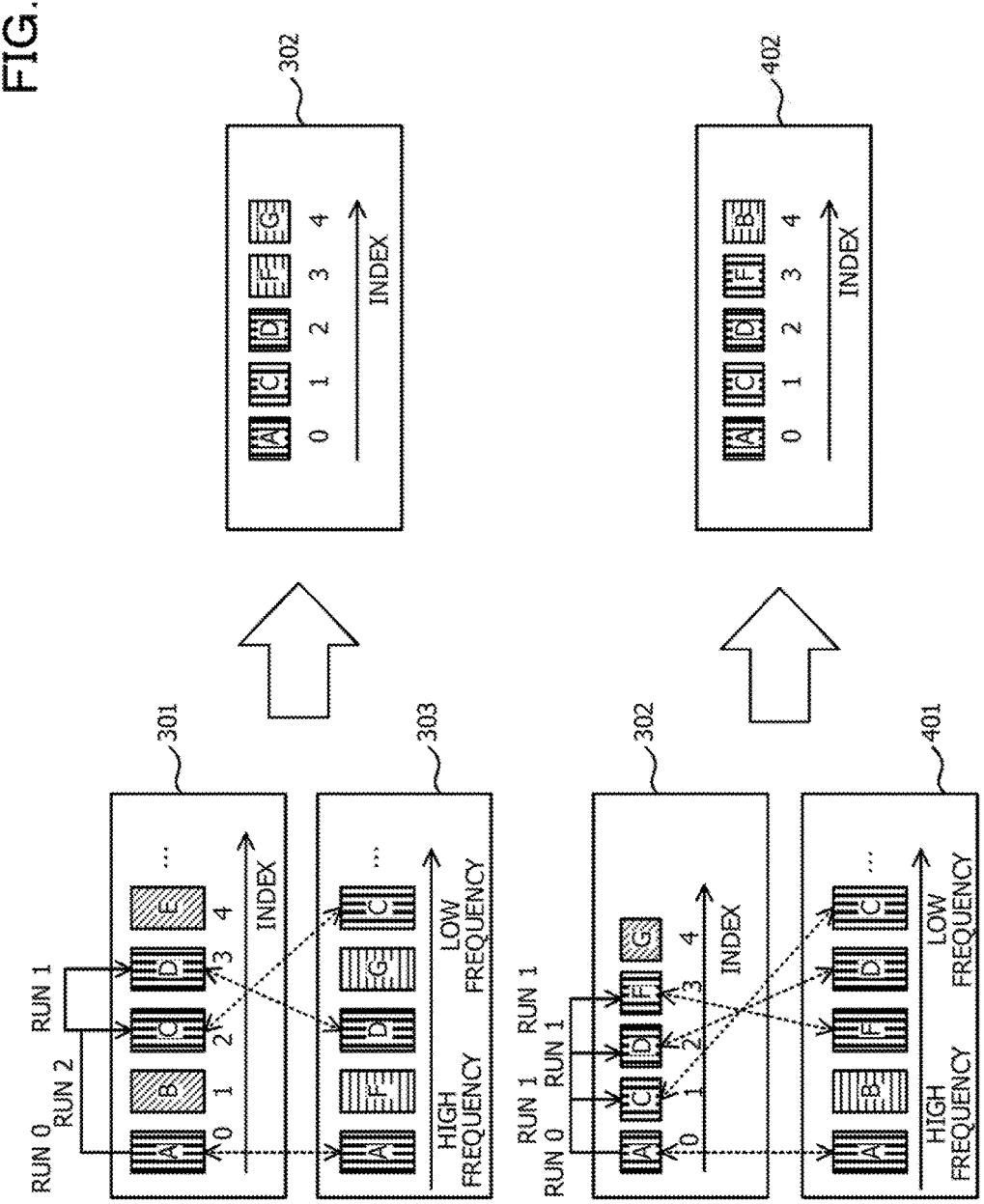
FIG. 4 is a diagram of a palette generating process on the next CU.

FIG. 4 depicts an example of a palette generating process on a CU next to the coding-target CU in the palette generating process of FIG. 3. When the color B is not included in the frequency histogram 303 for the coding-target CUs, the palette 302 to be generated based on the frequency histogram 303 does not include an entry of the color B.

However, when the frequency of the color B is high in the entire coding-target image, in CUs to be coded after the coding-target CU, the color B appears again shortly. For example, when the color B appears again in a CU next to the coding-target CU and a frequency histogram 401 for that CU is generated, a palette 402 for that CU is generated based on the frequency histogram 401.

In this example, the color A, the color B, the color F, the color D, and the color C included in the frequency histogram 401 are extracted as entry candidates. Among these, the color A is the same as the color of an entry indicated by the index "0" in the palette 302, and therefore this entry is reused in the palette 402. Thus, the generating section 113 codes a run "0" indicating the entry with the index "0" in the palette 302 and registers the coded run at the position of the index "0" in the palette 402.

Similarly, the color C, the color D, and the color F included in the frequency histogram 401 are the same as the colors of entries indicated by the index "1", the index "2", and the index "3" in the palette 302, and therefore these entries are reused in the palette 402.

Thus, the generating section 113 codes a run "1" representing a distance between the entry with the index "0" and the entry with the index "1" in the palette 302, and registers the coded run at the position of an index "1" in the palette 402.

Next, the generating section 113 codes a run "1" representing a distance between the entry with the index "1" and the entry with the index "2" in the palette 302, and registers the coded run at the position of an index "2" in the palette 402. Then, the generating section 113 codes a run "1" representing a distance between the entry with the index "2"

and the entry with the index "3" in the palette 302, and registers the coded run at the position of an index "3" in the palette 402.

Next, the generating section 113 adds the remaining entry candidates included in the frequency histogram 401 to the palette 402 as new entries, and directly codes the entries by using pixel values. With this, the color B registered at the position of the index "1" in the palette 301 is re-registered at the position of an index "4" in the palette 402.

For example, when each color component in a YUV color space is represented by eight bits, a code amount of 24 bits is generated as an additional cost for re-registering the color B. Furthermore, the entry of the color B to be newly added is added after the entry to be reused. Thus, when the entry is reused in a palette for another CU following the CU using the palette 402, the value of a run specifying the entry is large, and the code amount of the run is increased.

In this manner, in the palette generating method in JCTVC-V1005, "High Efficiency Video Coding (HEVC) Screen Content Coding: Draft 5", an entry to be reused is determined based only on a local correlation between the colors included in the immediately-preceding CU and the colors included in the coding-target CU. Thus, even if a color appears with high frequency in the entire coding-target image but happens to be not included in the coding-target CU, that color is removed from the palette, and the code amount for re-registering that color in the palette is increased.

Figure 5:
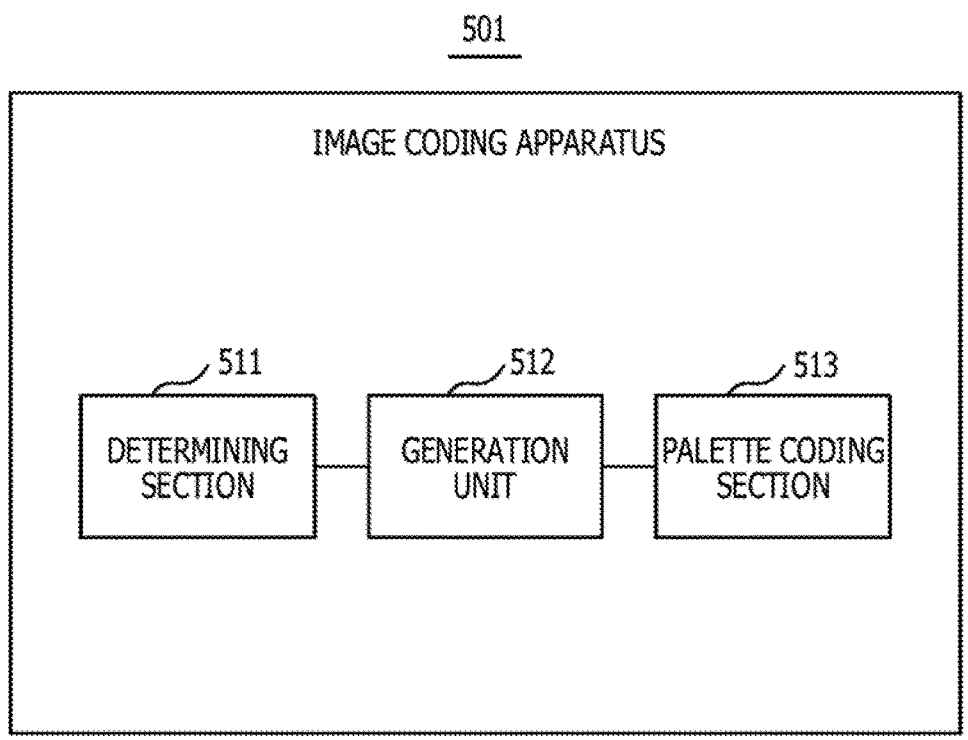
FIG. 5 is a diagram of the structure of an image coding apparatus.

FIG. 5 depicts an example of the structure of an image coding apparatus of the embodiment. An image coding apparatus 501 of FIG. 5 includes a determining section 511, a generating section 512, and a palette coding section 513.

Figure 6:
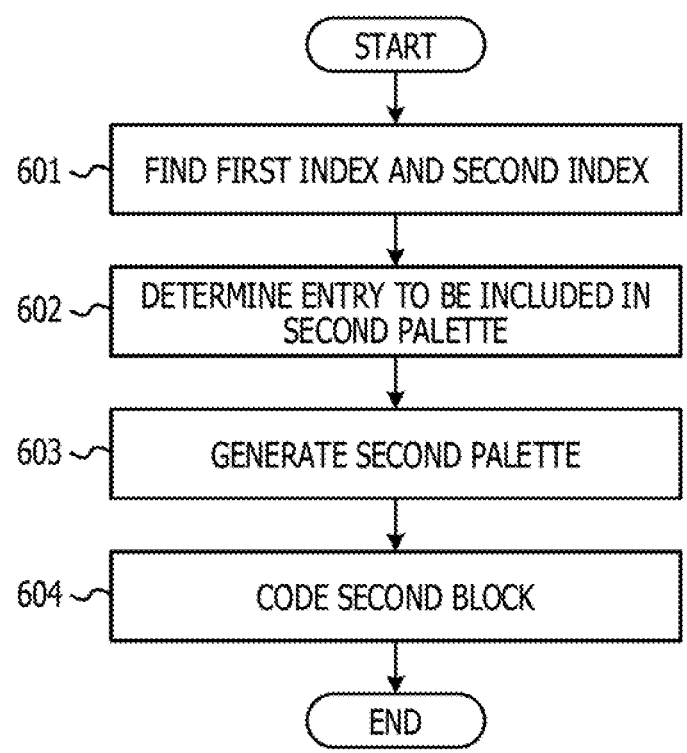
FIG. 6 is a flowchart of an image coding process.

FIG. 6 is a flowchart of an example of an image coding process to be performed by the image coding apparatus 501 of FIG. 5. First, when a specific entry included in a first palette for use in coding a first block in a coding-target image is not an entry candidate for a second palette, the determining section 511 finds a first index and a second index based on a pixel value distribution of the coding-target image (step 601).

The second palette is a palette for use in coding a second block to be coded after the first block. The first index indicates a code amount to be generated when the specific entry is to be included in the second palette, and the second index indicates a code amount to be generated when the specific entry is not to be included in the second palette.

Next, based on the first index and the second index, the determining section 511 determines an entry to be included in the second palette (step 602). The generating section 512 generates the second palette including the entry determined by the determining section 511 (step 603), and the palette coding section 513 codes the second block by using the second palette (step 604).

According to the image coding apparatus 501, coding efficiency in palette coding may be improved.

Figure 7:
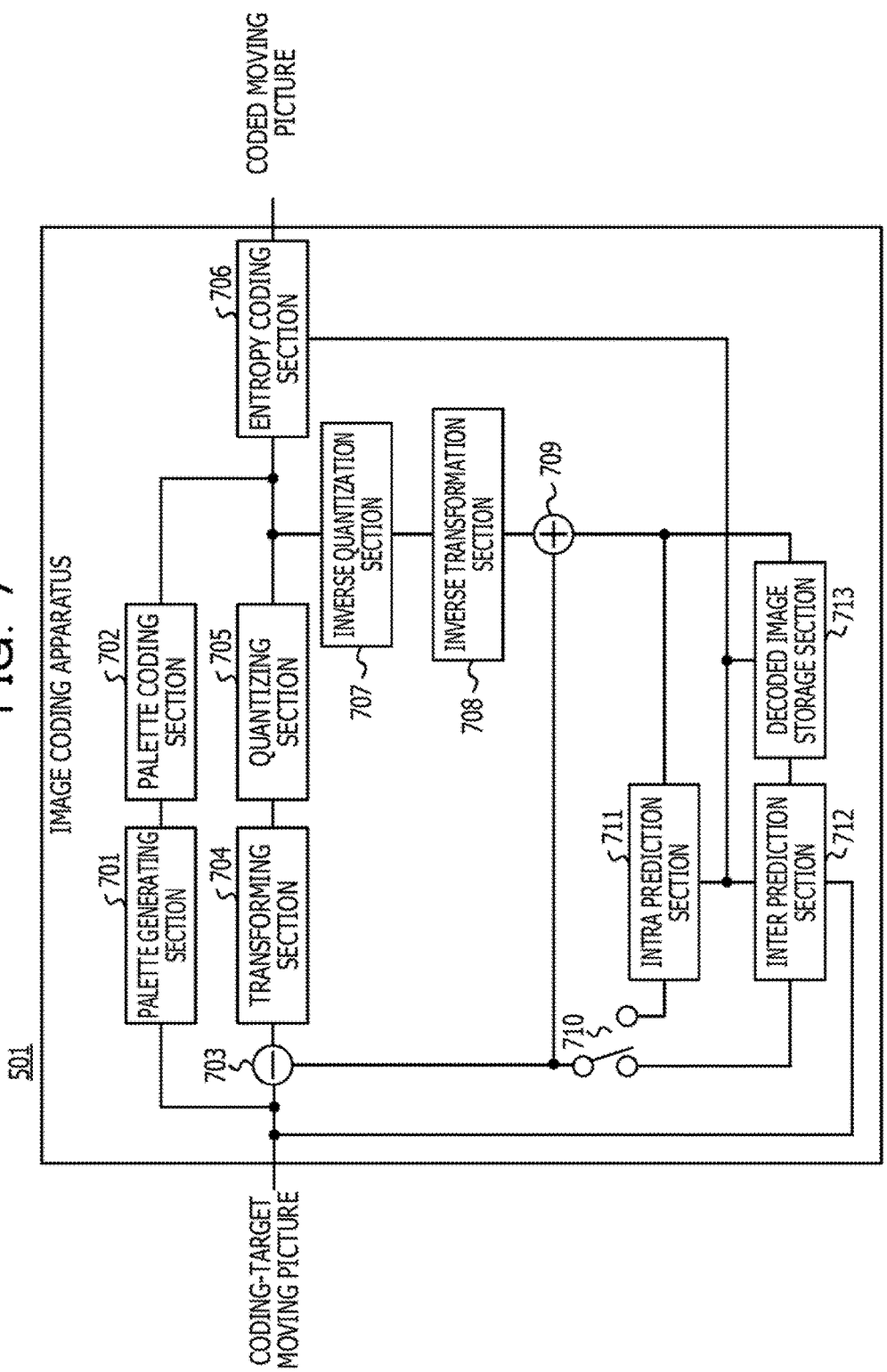
FIG. 7 is a diagram of the structure of a specific example of the image coding apparatus.

FIG. 7 depicts a specific example of the image coding apparatus 501 of FIG. 5. The image coding apparatus 501 of FIG. 7 includes a palette generating section 701, a palette coding section 702, a subtracting section 703, a transforming section 704, a quantizing section 705, and an entropy coding section 706. Furthermore, the image coding apparatus 501 includes an inverse quantization section 707, an inverse transformation section 708, an adding section 709, a selecting section 710, an intra prediction section 711, an inter prediction section 712, and a decoded image storage section 713. The palette coding section 702 corresponds to the palette coding section 513 of FIG. 5.

The image coding apparatus 501 may be implemented as, for example, a hardware circuit. In this case, the components of the image coding apparatus 501 may be each implemented as an individual circuit or may be implemented as a single integrated circuit.

The image coding apparatus 501 codes an inputted coding-target moving picture, and outputs the coded moving picture as a bit stream. The coding-target moving picture includes a plurality of images at a plurality of times of day. Each of these images is inputted to the image coding apparatus 501 as a coding-target image (coding-target picture). Each image may be a color image or monochrome image. When an image is a color image, a pixel value may be in an RGB format or YUV format.

The coding-target image is divided for each block, and each block is inputted as a coding-target block to the palette generating section 701, the subtracting section 703, and the inter prediction section 712. In the case of HEVC, each block corresponds to a CTU or CU.

The palette generating section 701 generates a palette for the coding-target block from a pixel value of each pixel included in the coding-target block, and outputs the generated palette to the palette coding section 702. The palette coding section 702 uses the palette outputted from the palette generating section 701 to replace the pixel value of each pixel of the coding-target block by an index, thereby coding the coding-target block, and then outputs the coding result to the entropy coding section 706.

The subtracting section 703 outputs, to the transforming section 704, a predictive error signal representing a difference between the coding-target block and a predicted block image outputted from the selecting section 710. By orthogonal transformation, the transforming section 704 transforms the predictive error signal from a spatial signal to a spatial frequency signal, and outputs the frequency signal separated into frequency components in a horizontal direction and a vertical direction to the quantizing section 705.

The quantizing section 705 quantizes the frequency signal outputted from the transforming section 704 with a predetermined step size, generates coefficient information, and outputs the coefficient information as the coding result to the entropy coding section 706 and the inverse quantization section 707. By quantization, the frequency signal is scaled down, and the code amount is reduced.

The inverse quantization section 707 inverse-quantizes the coding result outputted from the quantizing section 705 to turn the coefficient information signal back to an original scale, and outputs the inverse-quantized frequency signal to the inverse transformation section 708. By inverse orthogonal transformation, the inverse transformation section 708 turns the frequency signal outputted from the inverse quantization section 707 back to a spatial signal, and outputs a reconstruction predictive error signal to the adding section 709.

The adding section 709 adds the predicted block image outputted from the selecting section 710 and the reconstruction predictive error signal together, generates a decoded block image, and outputs the generated decoded block image to the intra prediction section 711 and the decoded image storage section 713. The decoded image storage section 713 accumulates the decoded block images, and outputs the accumulated decoded block images as reference images to the intra prediction section 711 and the inter prediction section 712.

By using the reference image, the intra prediction section 711 generates an intra-predicted block image of the coding-target block from pixel values of peripheral pixels already coded in the coding-target image, and outputs the intra-predicted block image to the selecting section 710. By using the reference images, the inter prediction section 712 performs motion compensation with respect to the coding-target block to generate an inter-predicted block image, and outputs the inter-predicted block image to the selecting section 710.

The selecting section 710 selects either one of the intra-predicted block image outputted from the intra prediction section 711 and the inter-predicted block image outputted from the inter prediction section 712, and outputs the selected predicted block image to the subtracting section 703 and the adding section 709.

The entropy coding section 706 entropy-codes the coding results outputted from the palette coding section 702 and the quantizing section 705 and the prediction mode information outputted from the intra prediction section 711 and the inter prediction section 712. In entropy coding, a variable-length code is allocated in accordance with the frequency of appearance of each symbol in a signal. Then, the entropy coding section 706 outputs a bit stream including the variable-length codes.

The image coding apparatus 501 transmits the coded moving picture including the coding results of a plurality of images to the image decoding apparatus not depicted, and the image decoding apparatus decodes the coded moving picture to restore the coding-target moving picture.

The image coding apparatus 501 is used for various purposes. For example, the image coding apparatus 501 may be incorporated in a video camera, video transmitting apparatus, video receiving apparatus, television telephone system, computer, or portable telephone set.

Figure 8:
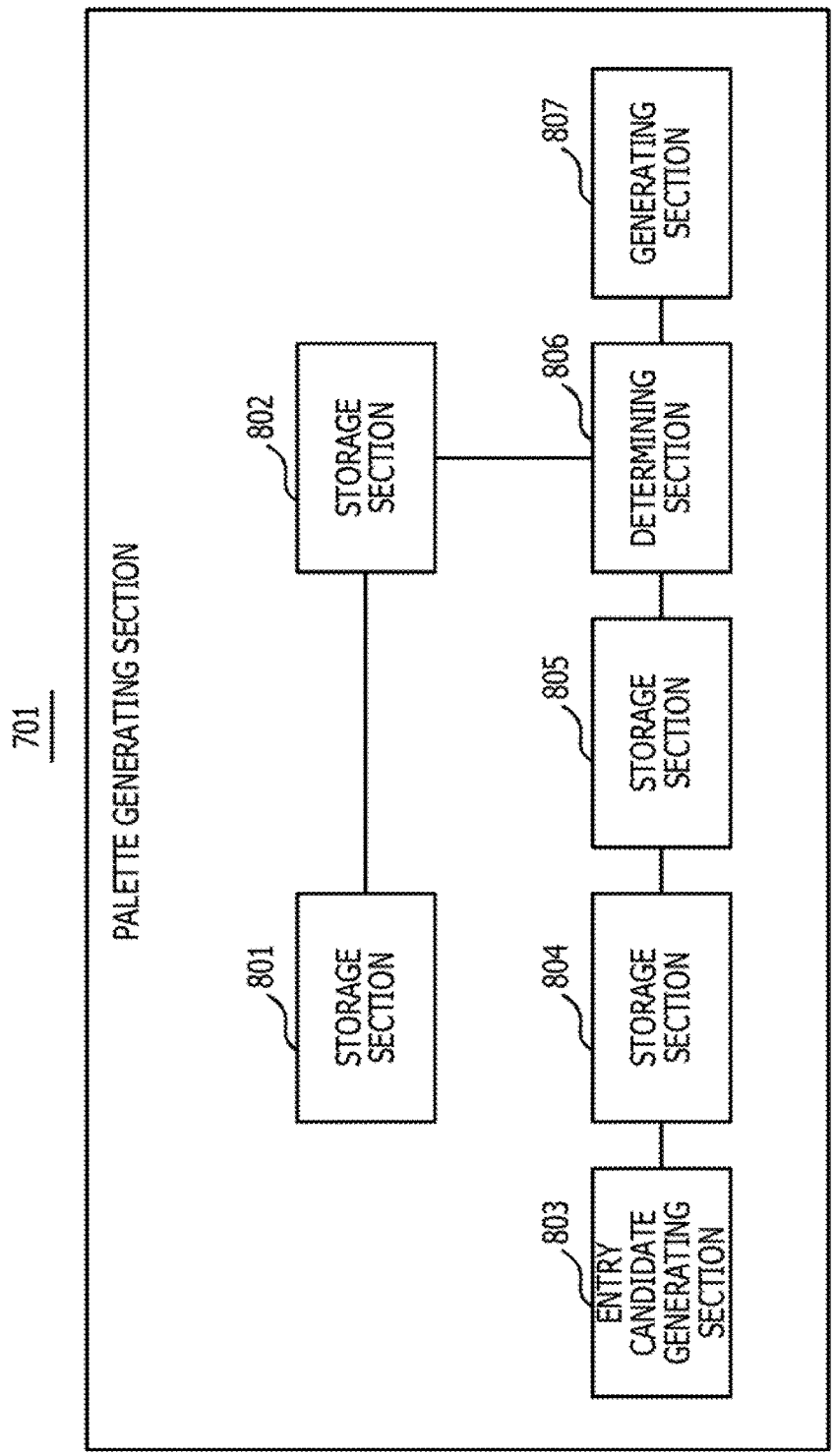
FIG. 8 is a diagram of the structure of a palette generating section using pixel value distribution information.

FIG. 8 depicts an example of the structure of the palette generating section 701 of FIG. 7. The palette generating section 701 of FIG. 8 includes an analyzing section 801, a storage section 802, an entry candidate generating section 803, a storage section 804, a comparing section 805, a determining section 806, and a generating section 807. The determining section 806 and the generating section 807 correspond to the determining section 511 and the generating section 512, respectively, of FIG. 5.

The analyzing section 801 analyzes pixel values of all blocks included in the coding-target image, and generates pixel value distribution information representing a pixel value distribution of the coding-target image, and stores the generated pixel value distribution information in the storage section 802. For example, the analyzing section 801 calculates a frequency of appearance of each color in the entire coding-target image, and generates pixel value distribution information indicating frequencies of appearance of a plurality of colors.

The entry candidate generating section 803 extracts, from among pixel values of a coding-target block, an entry candidate to be registered in a palette for the coding-target block, and stores the extracted entry candidate in the storage section 804. For example, the entry candidate generating section 803 generates a frequency histogram of colors included in the coding-target block, and sequentially extracts a predetermined number of colors in descending order of frequency as entry candidates.

The comparing section 805 compares an entry candidate stored in the storage section 804 and entries included in a palette fed back from the generating section 807. The fed-back palette is a palette for a block coded immediately before the coding-target block. Then, the comparing section 805 outputs, to the determining section 806, a comparison result as to whether the same color as that of the entry candidate is included in the fed-back palette.

Based on the comparison result outputted by the comparing section 805, the determining section 806 specifies an entry that is not an entry candidate for the palette of the coding-target block, from among the entries included in the palette for the immediately-previously coded block. Next, based on the pixel value distribution information stored in the storage section 802, the determining section 806 finds a first index indicating a code amount to be generated when the specified entry is to be included in the palette and a second index indicating a code amount to be generated when that entry is not to be included in the palette.

Then, based on the first index and the second index, the determining section 806 determines whether that entry is to be included in the palette of the coding-target block, and outputs entry information indicating entries to be included in the palette to the generating section 807. In accordance with the entry information outputted by the determining section 806, the generating section 807 generates a palette for the coding-target block including an entry to be left on the palette and an entry to be newly added to the palette.

Figure 9:
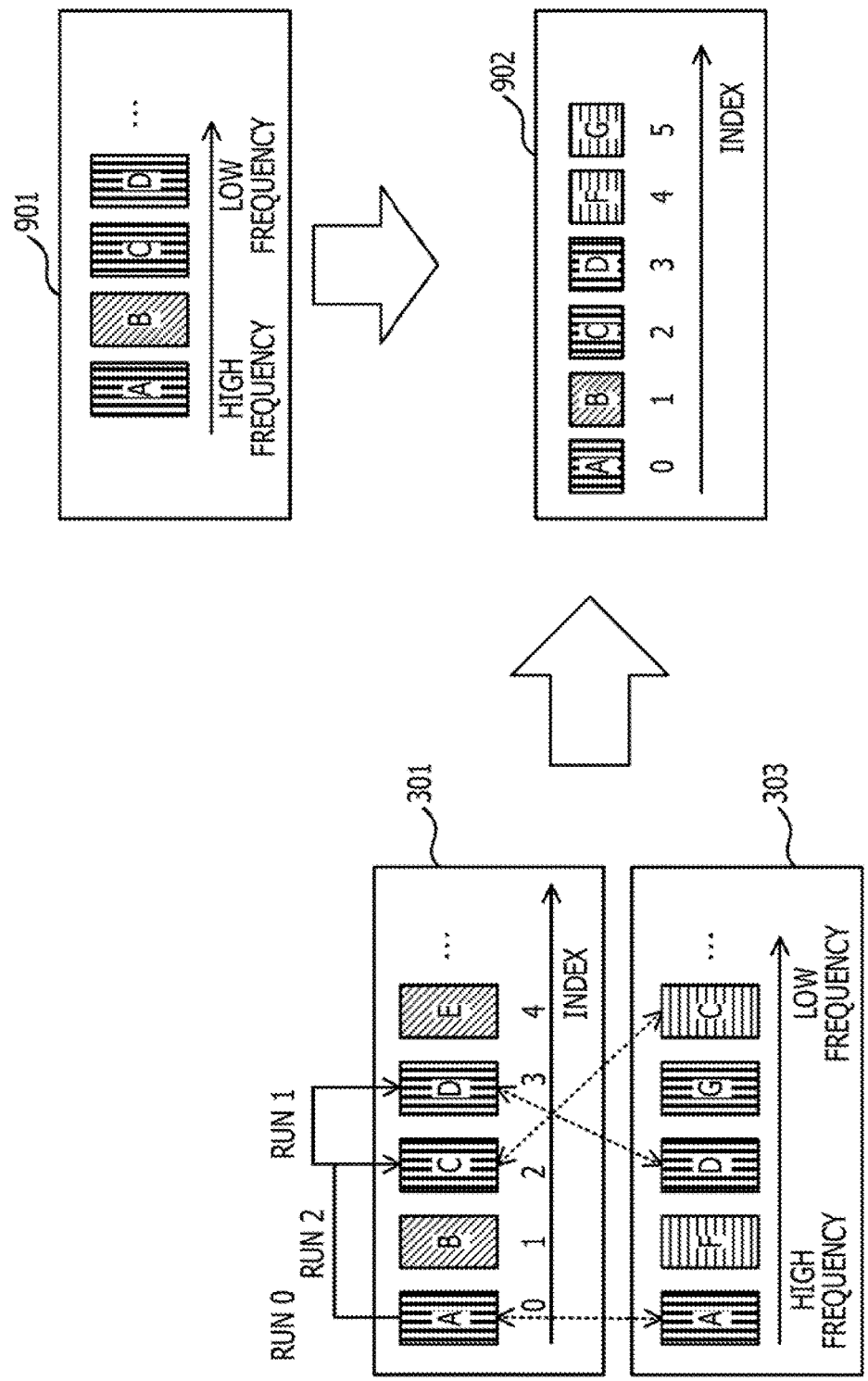
FIG. 9 is a diagram of a palette generating process using the pixel value distribution information.

FIG. 9 depicts an example of a palette generating process to be performed by the palette generating section 701 of FIG. 8. By using the entries in the palette 301 of FIG. 3, the palette generating section 701 generates a palette 902 for the coding-target CU. The palette 301 is a palette for the immediately-previously coded CU.

The analyzing section 801 analyzes the pixel values of the entire coding-target image, and generates pixel value distribution information 901 representing a pixel value distribution of the coding-target image. For example, as the pixel value distribution information 901, a frequency histogram representing a frequency of appearance of each color included in the coding-target image may be used.

The entry candidate generating section 803 generates the frequency histogram 303 of colors in the coding-target CU, and sequentially extracts, as entry candidates, a predetermined number of colors in descending order of frequency in the frequency histogram 303. The comparing section 805 compares the colors of the entry candidates and the colors registered in the palette 301.

In this example, the color A, the color F, the color D, the color G, and the color C included in the frequency histogram 303 are extracted as entry candidates. Among these, the color A, the color C, and the color D are the same as the colors of the entries indicated by the index "0", the index "2", and the index "3" in the palette 301. Therefore, these entries are reused in the palette 902. Thus, the determining section 806 determines that the entries of the color A, the color C, and the color D are to be included in the palette 902.

On the other hand, the color B of the entry indicated by the index "1" in the palette 301 is not present in the coding-target CU, and therefore is not to be included as an entry candidate.

Thus, based on the pixel value distribution information 901, the determining section 806 finds a probability of occurrence at which the color B occurs in a CU to be coded after the coding-target CU. Then, based on the probability of occurrence of the color B, the determining section 806 finds a first index indicating a code amount to be generated when the color B is to be included in the palette 902 and a second index indicating a code amount to be generated when the color B is not to be included in the palette 902.

When the code amount indicated by the second index is larger than the code amount indicated by the first index, the determining section 806 determines that the entry of the color B is to be included in the palette 902. On the other hand, when the code amount indicated by the second index is equal to or smaller than the code amount indicated by the first index, the determining section 806 determines that the entry of the color B is not to be included in the palette 902. In this example, since the code amount indicated by the second index is larger than the code amount indicated by the first index, it is determined that the entry of the color B is to be included in the palette 902. Therefore, four entries indicated by the index "0" to the index "3" in the palette 301 are left on the palette 902.

First, the generating section 807 codes a run "0" indicating the entry with the index "0" in the palette 301, and registers the coded run at the position of an index "0" in the palette 902. Next, the generating section 807 codes the run "1" representing a distance between the entry with the index "0" and the entry with the index "1" in the palette 301, and registers the coded run at the position of an index "1" in the palette 902.

Next, the generating section 807 codes a run "1" representing a distance between the entry with the index "1" and the entry with the index "2" in the palette 301, and registers the coded run at the position of the index "2" in the palette 902. Then, the generating section 807 codes a run "1" representing a distance between the entry with the index "2" and the entry with the index "3" in the palette 301, and registers the coded run at the position of an index "3" in the palette 902.

The determining section 806 determines that the color F and the color G, which are the remaining entry candidates not included in the palette 301, are to be included in the palette 902. Thus, the generating section 113 registers entries including the pixel values of the color F and the color G at the positions of indexes "4" and "5", respectively, in the palette 902.

In this manner, based on the frequency of appearance of the colors in the entire coding-target image, the determining section 806 probabilistically estimates a code amount to be generated when the entry of a color is left on the palette and a code amount to be generated when the entry is removed from the palette. By comparing the estimated code amounts of two types to determine whether the color is to be left on the palette, the code amount of the palette for the coding-target image may be probabilistically optimized.

Next, a method of calculating a first index and a second index for an i-th color included in pixel value distribution information is described. The determining section 806 calculates a ratio of the number of pixels of an i-th color with respect to the number of pixels of the coding-target image, and uses the calculated ratio as a probability of occurrence $pi$ at which that color occurs in a block to be coded after a coding-target block.

When the entry of the i-th color is left on the palette for the coding-target block, that entry is inserted at the position of a relatively small index in the palette. Therefore, the run of the entry left on the palette is short. However, a code for continuously retaining the entry of the i-th color in the palette is generated. Furthermore, since the number of entries to be registered is increased, the code amount of the indexes is also increased.

In this case, by using the code amount of the run when the entry of the i-th color is continuously retained, the determining section 806 is capable of calculating a first index Q1 indicating a code amount to be generated by using the following equation.

$$Q1 = \text{code amount of the run} \quad (1)$$

On the other hand, when the entry of the i-th color is removed from the palette for the coding-target block and is re-registered in a palette for a subsequent block, that entry is newly registered after the entry left on the palette, and a code for registering a pixel value is generated. However, a code amount for retaining the entry of the i-th color in the palette is cut out.

In this case, by using the probability of occurrence $pi$, the code amount of the pixel value of the i-th color, the code amount of a run of a palette having that color re-registered therein, and the code amount of a run of a palette having that color not re-registered therein, the determining section 806 is capable of calculating a second index Q2 indicating a code amount to be generated by using the following equation.

$$Q2 = (\text{code amount of the pixel value} + \text{code amount of the run of the re-registered palette}) \times pi + \text{code amount of the run of the not-re-registered palettex}(1-pi) \quad (2)$$

The code amount of the pixel value in the equation (2) corresponds to a code amount for re-registering the entry of a color which is removed from the palette for the coding-target block but appears in a subsequent block, the re-registration being in the palette for the subsequent block. Since the code amount of the pixel value for re-registering the color is larger than the code amount of a run for reusing an entry in the palette for the immediately-preceding block, if the probability of occurrence $pi$ has a certain size, it may be thought that the first term of the equation (2) is more dominant than the second term.

First, consider the case in which a correspondence between a run and a run code is represented by truncated unary binarization. Truncated unary binarization is a scheme of binarizing a numeral by taking a termination code of a value as "0".

FIG. 10 depicts an example of code strings in truncated unary binarization described in non-patent literature 1. According to the code strings of FIG. 10, a run "0" is represented by one value, a run "1" is represented by two values, and a run "2" is represented by three values. When the probability that the value in a code string becomes "0" and the probability that the value in a code string becomes "1" are each 50% and bypass coding using one bit for representing one value is performed, the run "0", the run "1", and the run "2" are represented by one bit, two bits, and three bits, respectively.

In the code strings of FIG. 10, "0" representing a termination code and "1" representing a numeral may be reversed. The binarizing method is not restricted to truncated unary binarization. For example, a run may be binarized by using exponential Golomb coding.

FIG. 11 depicts an example of code strings in exponential Golomb coding described in non-patent literature 1. According to the code strings of FIG. 11, a run "0" is represented by one value, a run "1" is represented by three values, and a run "2" is represented also by three values. When the probability that the value in a code string becomes "0" and the probability that the value in a code string becomes "1" are each 50% and bypass coding using one bit for representing one value is performed, the run "0", the run "1", and the run "2" are represented by one bit, three bits, and three bits, respectively.

Figure 12A:
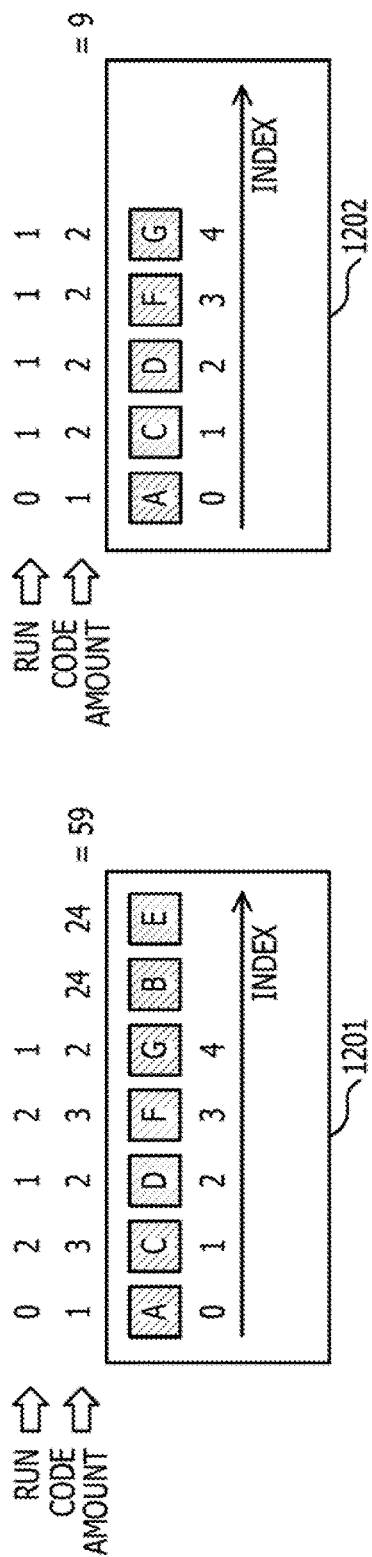
FIG. 12A and FIG. 12B are diagrams of a method of calculating a first index and a second index.
Figure 12B:
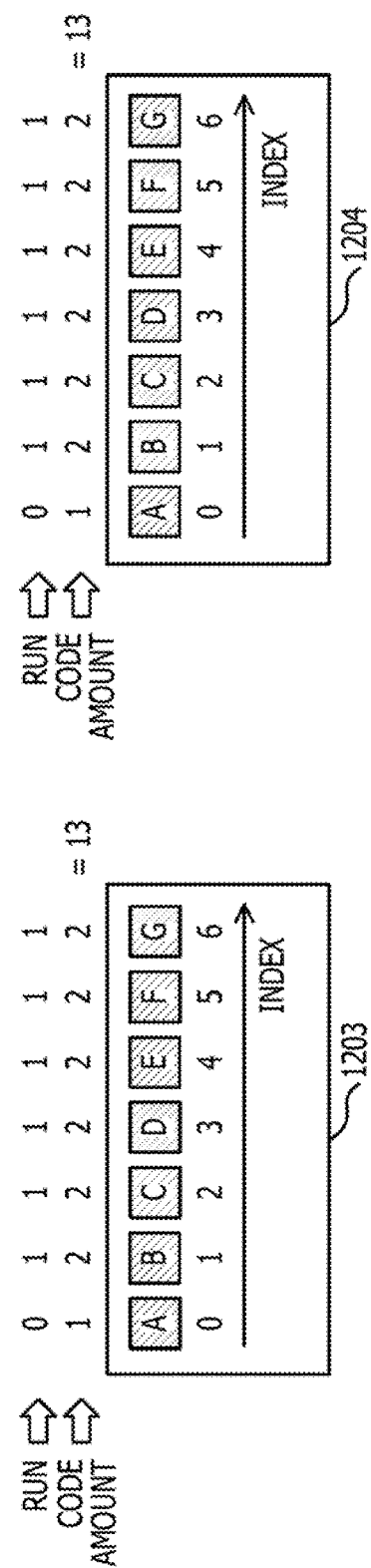

FIG. 12A and FIG. 12B depict an example of a method of calculating a first index and a second index. In this example, for simplification, truncated unary binarization is adopted. When the color B and the color E are included in a palette for an immediately-previously coded CU but are not included in that for the coding-target CU, an index Q1 and an index Q2 are calculated for these colors.

First, after the entries of the color B and the color E are removed from the palette for the coding-target CU, when the color B and the color E are extracted as entry candidates in a CU next to the coding-target CU, the entries of the color B and the color E are re-registered in a palette 1201, as depicted in FIG. 12A.

In this example, runs of the color A, the color C, the color D, the color F, and the color G on the palette 1201 are "0", "2", "1", "2", and "1", respectively. In this case, by applying truncated unary binarization of FIG. 10, the code amounts of the runs of the color A, the color C, the color D, the color F, and the color G are one bit, three bits, two bits, three bits, and two bits, respectively. Therefore, the code amount of the runs in the palette 1201 is eleven bits in total.

Also, when the code amount of a pixel value of one color is 24 bits, the code amounts of the entries of the color B and the color E to be re-registered are 48 bits in total.

On the other hand, when the color B and the color E are not extracted as entry candidates in the CU next to the coding-target CU, a palette 1202 without having the color B and the color E re-registered therein is generated.

In this example, runs of the color A, the color C, the color D, the color F, and the color G on the palette 1202 are "0", "1", "1", "1", and "1", respectively. In this case, by applying truncated unary binarization of FIG. 10, the code amounts of the runs of the color A, the color C, the color D, the color F, and the color G are one bit, two bits, two bits, two bits, and two bits, respectively. Therefore, the code amount of the runs in the palette 1202 is nine bits in total.

When the probabilities of occurrence pi of the color B and the color E are both p, the index Q2 is calculated by using the equation (2) as in the following equation.

$$Q2 = (48 \text{ bits} + 11 \text{ bits}) \times p + 9 \text{ bits} \times (1 - p) \quad (3)$$
$$= 59 \text{ bits} \times p + 9 \text{ bits} \times (1 - p)$$

Next, after the entries of the color B and the color E are left on the palette for the coding-target CU, when the color B and the color E are extracted as entry candidates in the CU next to the coding-target CU, a palette 1203 is generated, as depicted in FIG. 12B.

In this example, a run of the color A is "0" and runs of the color B to the color G are "1" on the palette 1203. In this case, by applying truncated unary binarization of FIG. 10, the code amount of the run of the color A is one bit, and the code amounts of the runs of the color B to the color G are two bits each. Therefore, the code amount of the runs in the palette 1203 is thirteen bits in total.

On the other hand, even if the color B and the color E are not extracted as entry candidates in the CU next to the coding-target CU, a palette 1204 having these colors left thereon is generated in order to continuously retain the entries of the color B and the color E. The code amount of the runs in the palette 1204 is thirteen bits in total, which is equal to that of the palette 1203.

Therefore, the index Q1 is calculated by using the equation (1) as in the following equation.

$$Q1 = 13 \text{ bits} \quad (4)$$

For example, when the frequencies of appearance and the probabilities of occurrence p of the color B and the color E in the coding-target image are large, the first term of the equation (3) is dominant, and therefore Q2 is larger than Q1.

In this case, it is determined that the entries of the color B and the color E are to be left on the palette for the coding-target CU.

Conversely, when the frequencies of appearance and the probabilities of occurrence p of the color B and the color E in the coding-target image are small, the second term of the equation (3) is more dominant, and therefore Q2 is smaller than Q1. In this case, it is determined that the entries of the color B and the color E are not to be left on the palette for the coding-target CU.

As the probability of occurrence p is smaller, the influence of the first term of the equation (3) is smaller. Therefore, by assuming that Q2 of the equation (3) is equal to Q1 of the equation (4), a probability of occurrence pm that the code amounts of two types are balanced may be found. When Q2 of the equation (3) is equal to Q1 of the equation (4), the following equation holds.

$$59 \text{bits} \times \text{pm} + 9 \text{ bits} \times (1 - \text{pm}) = 13 \text{ bits} \quad (5)$$

From the equation (5), pm is calculated as in the following equation.

$$pm = (13 \text{ bits} - 9 \text{ bits})/(59 \text{ bits} - 9 \text{ bits}) \quad (6)$$
$$= 4 \text{ bits}/50 \text{ bits}$$
$$= 0.08$$

Therefore, when the probability of occurrence p is larger than 0.08, it is determined that the entries of the color B and the color E are to be left on the palette for the coding-target CU. When the probability of occurrence p is equal to or smaller than 0.08, it is determined that the entries of the color B and the color E are not to be left on the palette for the coding-target CU.

Figure 13:
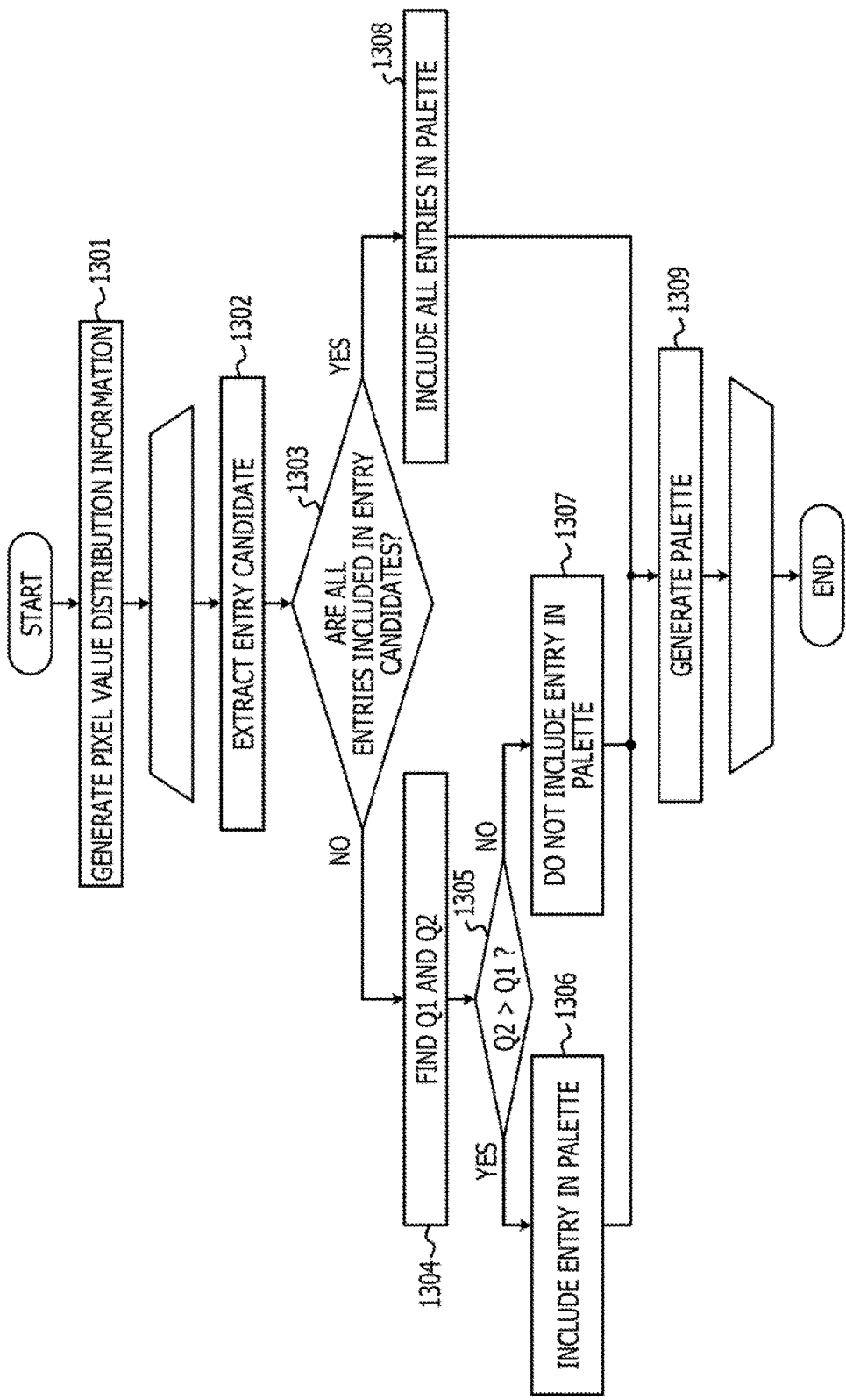
FIG. 13 is a flowchart of a palette generating process using the pixel value distribution information.

FIG. 13 is a flowchart of an example of a palette generating process to be performed by the palette generating section 701 of FIG. 8. First, the analyzing section 801 analyzes pixel values of the coding-target image, and generates pixel value distribution information (step 1301).

Next, the palette generating section 701 performs a loop process at step 1302 1 to step 1309 for each block in the coding-target image. First, the entry candidate generating section 803 extracts entry candidates for a coding-target block from among pixel values of a coding-target block (step 1302). Next, the comparing section 805 compares the entry candidates and entries in a palette for an immediately-previously coded block (step 1303).

When a specific entry in the palette for the immediately-previously coded block is not included in the entry candidates (NO at step 1303), the determining section 806 finds the index Q1 and the index Q2 for the specific entry based on the pixel value distribution information (step 1304). The determining section 806 then compares the index Q1 and the index Q2 (step 1305).

When the index Q2 is larger than the index Q1 (YES at step 1305), the determining section 806 determines that the specific entry is to be included in the palette for the coding-target block (step 1306). On the other hand, when the index Q2 is equal to or smaller than the index Q1 (NO at step 1305), the determining section 806 determines that the specific entry is not to be included in the palette for the coding-target block (step 1307).

Next, the generating section 807 generates the palette for the coding-target block including an entry to be left on the palette and an entry to be newly added to the palette (step 1309). When the index Q2 is larger than the index Q1, among the entries in the palette for the immediately-previously coded block, an entry included in the entry candidates and a specific entry not included in the entry candidates are left on the palette. On the other hand, when the index Q2 is equal to or smaller than the index Q1, among the entries in the palette for the immediately-previously coded block, only an entry included in the entry candidates is left on the palette.

Then, by using the next block as a coding-target block, the palette generating section 701 repeats the processes at step 1302 onward.

On the other hand, when all entries in the palette for the immediately-previously coded block are included in the entry candidates (YES at step 1303), the determining section 806 determines that all of these entries are to be included in the palette for the coding-target block (step 1308). The palette generating section 701 then performs the processes at step 1309 onward.

If palettes for all blocks in the coding-target image have been generated, the palette generating section 701 ends the process. According to the palette generating process as described above, the code amount of each palette may be optimized based on the pixel value distribution information of the entire coding-target image.

Meanwhile, in place of analyzing the pixel values of the entire coding-target image, the palette generating section 701 may analyze pixel values of a block coded before the coding-target block and the coding-target block and generate pixel value distribution information of the coding-target image stepwise.

In this case, the analyzing section 801 accumulates, in the storage section 802 for each block, the analysis results of the pixel values of the blocks included in the coding-target image. Then, by using the analysis result of analyzing the pixel values of the coding-target block and the analysis results accumulated in the storage section 802, the analyzing section 801 generates pixel value distribution information, and stores the generated pixel value distribution information in the storage section 802.

With this, statistical information of the pixel values of the coding-target image are accumulated for each block, and the pixel value distribution information is updated for each block. Based on the pixel value distribution information updated for each block, the determining section 806 finds a first index and a second index.

Figure 14:
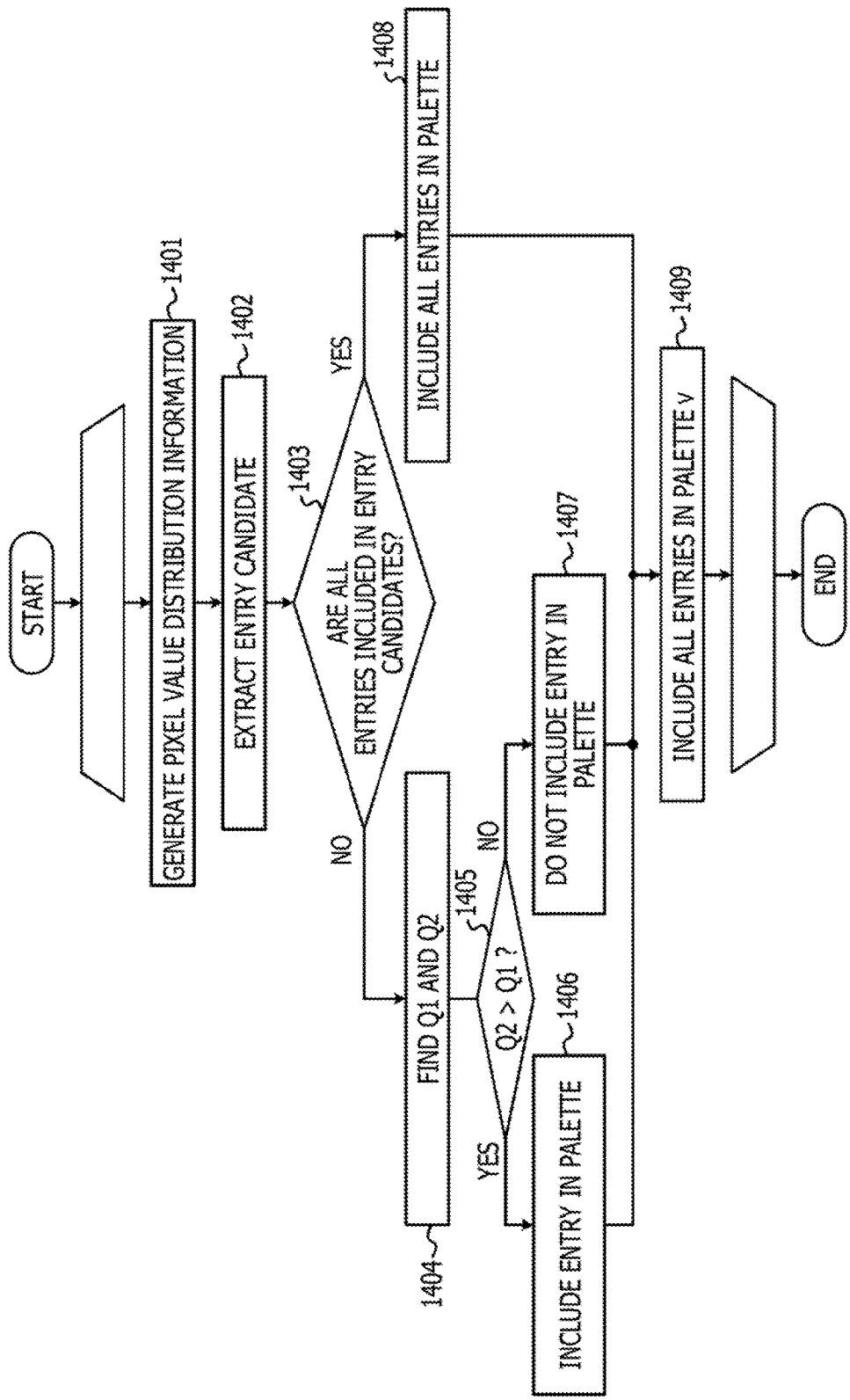
FIG. 14 is a flowchart of a palette generating process in which the pixel value distribution information is updated for each block.

FIG. 14 is a flowchart of an example of a palette generating process in which the pixel value distribution information is updated for each block. The palette generating section 701 performs a loop process at step 1401 to step 1409 for each block in the coding-target image.

First, the analyzing section 801 analyzes the pixel values of the coding-target block and, by using the obtained analysis result and the analysis results accumulated in the storage section 802, generates pixel value distribution information of the coding-target image (step 1401).

The processes at step 1402 to step 1409 are similar to the processes at step 1302 to step 1309 of FIG. 13. After the process at step 1409, the palette generating section 701 uses the next block as a coding-target block to repeat the processes at step 1401 onward.

According to the palette generating process as described above, a process of initially generating pixel value distribution information for the entire coding-target image may be omitted to optimize the code amount of the palette based on pixel value distribution information generated stepwise.

In the palette generating processes in FIG. 13 and FIG. 14, the analyzing section 801 may not generate pixel value distribution information by taking the entire coding-target image as a target, but may generate pixel value distribution information by taking a partial region of the coding-target image as a target. For example, the analyzing section 801 may divide the coding-target image into regions each having a predetermined size and generate pixel value distribution information based on the pixel value of a region to which the coding-target block belongs.

The structures of the image coding apparatus 501 of FIG. 5 and FIG. 7 are merely examples, and part of the components may be omitted or changed in accordance with the use purpose or condition of the image coding apparatus 501. For example, in the image coding apparatus 501 of FIG. 7, when block prediction coding is not performed, the subtracting section 703, the transforming section 704, the quantizing section 705, the inverse quantization section 707, the inverse transformation section 708, and the adding section 709 may be omitted. In this case, the selecting section 710, the intra prediction section 711, the inter prediction section 712, and the decoded image storage section 713 may also be omitted. When entropy coding is not performed, the entropy coding section 706 may be omitted.

The structure of the palette generating section 701 of FIG. 8 is merely an example, and part of the components may be omitted or changed in accordance with the use purpose or condition of the image coding apparatus 501. For example, when pixel value distribution information is inputted from outside of the image coding apparatus 501, the analyzing section 801 and the storage section 802 may be omitted.

The flowcharts depicted in FIG. 6, FIG. 13, and FIG. 14 are merely examples, and part of the processes may be omitted or changed in accordance with the structure or condition of the image coding apparatus 501. For example, when Q2 and Q1 have a match at step 1305 of FIG. 13 or step 1405 of FIG. 14, the determining section 806 may determine that the specific entry is to be included in the palette for the coding-target block.

The syntaxes of FIG. 2, the code strings of FIG. 10, and the code strings of FIG. 11 are merely examples, and another syntax or code string may be used in accordance with the moving picture coding standard.

The palette 301, the palette 302, and the frequency histogram 303 of FIG. 3, the frequency histogram 401 and the palette 402 of FIG. 4, the pixel value distribution information 901 and the palette 902 of FIG. 9, and the palette 1201 to the palette 1204 of FIGS. 12A and 12B are merely examples. Another palette, frequency histogram, and pixel value distribution information may be generated in accordance with the coding-target moving picture.

The equation (1) to the equation (6) are merely examples, and another formula may be used in accordance with the structure or condition of the image coding apparatus 501. For example, in place of the code amount of the pixel value in the equation (2), another code amount for re-registering the entry of a color removed from the palette may be used.

The coding-target image to which palette coding is applied is not restricted to a screen content image, but may be another image with less variations of pixel values. Also, the coding-target image to which palette coding is applied is not restricted to a moving picture, but may be a still image.

Figure 15:
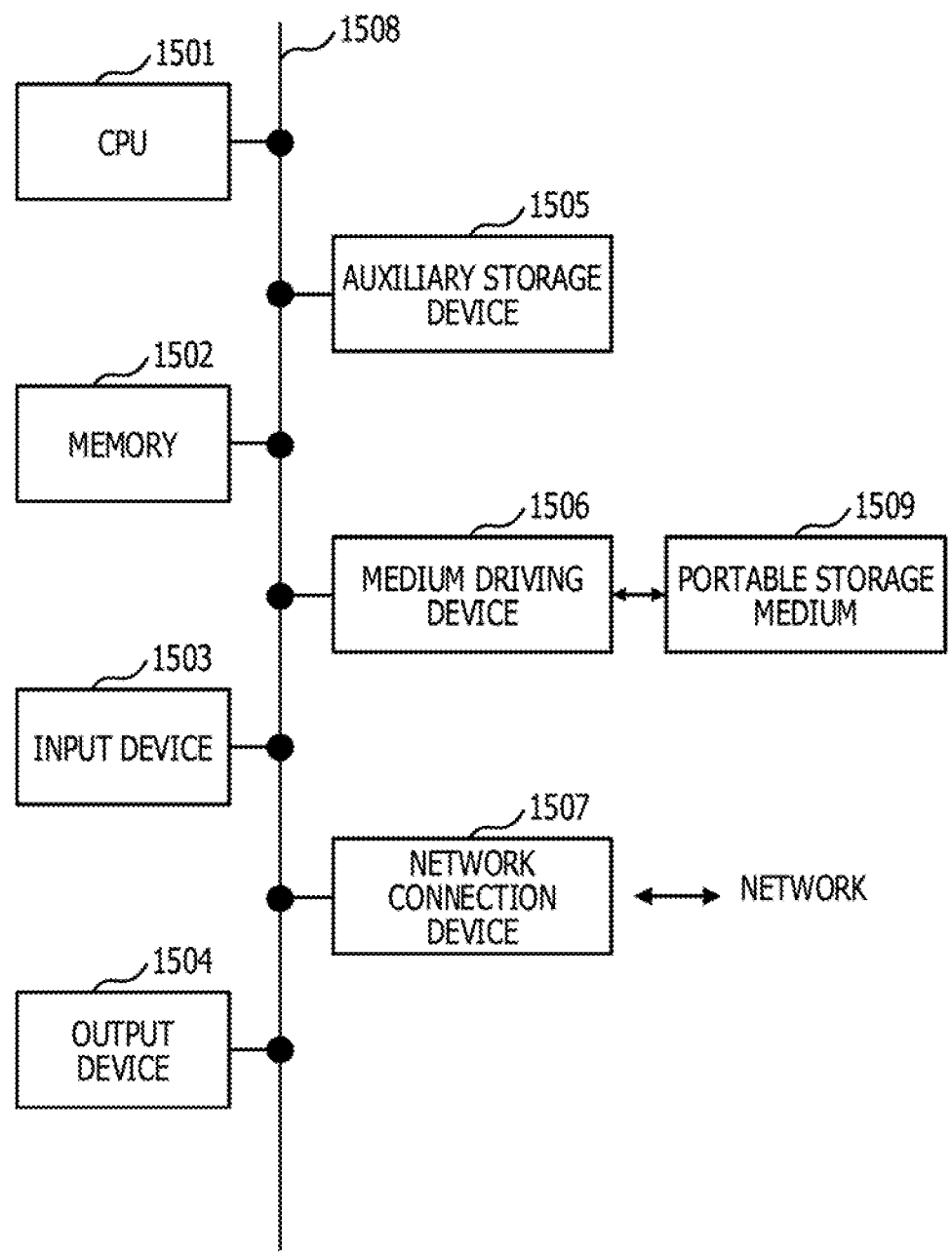
FIG. 15 is a diagram of the structure of an information processing apparatus.

The image coding apparatus 501 of FIG. 5 and FIG. 7 may be implemented as a hardware circuit, and may be implemented by using an information processing apparatus (computer) as depicted in FIG. 15.

The information processing apparatus of FIG. 15 includes a central processing unit (CPU) 1501, a memory 1502, an input device 1503, an output device 1504, an auxiliary storage device 1505, a medium driving device 1506, and a network connection device 1507. These components are mutually connected via a bus 1508.

The memory 1502 is, for example, a semiconductor memory such as a read only memory (ROM), random access memory (RAM), or flash memory, storing a program and data for use in an image coding process. The memory 1502 is usable as the decoded image storage section 713 of FIG. 7, and the storage section 802 and the storage section 804 of FIG. 8.

For example, by executing a program by using the memory 1502, the CPU 1501 (processor) operates as the determining section 511, the generating section 512, and the palette coding section 513 of FIG. 5. In other words, by executing a program stored in the memory 1502, the CPU 1501 is transformed as appropriate to a circuit for achieving various functions of the determining section 511, the generating section 512, and the palette coding section 513 of FIG. 5, and so forth.

For example, by executing a program by using the memory 1502, the CPU 1501 operates also as the palette generating section 701, the palette coding section 702, the subtracting section 703, the transforming section 704, the quantizing section 705, and the entropy coding section 706 of FIG. 7. The CPU 1501 operates also as the inverse quantization section 707, the inverse transformation section 708, the adding section 709, the selecting section 710, the intra prediction section 711, and the inter prediction section 712.

By executing a program by using the memory 1502, the CPU 1501 operates also as the analyzing section 801, the entry candidate generating section 803, the comparing section 805, the determining section 806, and the generating section 807 of FIG. 8.

The input device 1503 is, for example, a keyboard, pointing device, or the like, and is used to make an instruction and input information from a user or operator. The output device 1504 is, for example, a display device, printer, loudspeaker, or the like, and is used to make an inquiry to the user or operator and output the process result.

The auxiliary storage device 1505 is, for example, a magnetic disc device, optical disk device, magneto-optical disk device, tape device, or the like. The auxiliary storage device 1505 may be a hard disk drive. The information processing apparatus may store a program and data in the auxiliary storage device 1505 and load them into the memory 1502 for use.

The medium driving device 1506 drives a portable storage medium 1509 to access its recorded contents. The portable storage medium 1509 is a memory device, flexible disk, optical disk, magneto-optical disk, or the like. The portable storage medium 1509 may be a compact disk read only memory (CD-ROM), digital versatile disk (DVD), or universal serial bus (USB) memory. The user or operator may store a program and data in this portable storage medium 1509 and load them into the memory 1502 for use.

As described above, computer-readable storage media having a program and data to be used for processing stored therein include physical (non-transitory) storage media such as the memory 1502, the auxiliary storage device 1505, and the portable storage medium 1509.

The network connection device 1507 is a communication interface connected to a communication network such as a local area network (LAN) or the Internet for data transformation associated with communication. The network connection device 1507 may transmit a coded moving picture to an image decoding apparatus. The information processing apparatus may receive a program and data from an external apparatus via the network connection device 1507 and load them into the memory 1502 for use.

The information processing apparatus may not include all components in FIG. 15, and part of the components may be omitted in accordance with the use purpose or condition. For example, the input device 1503 and the output device 1504 may be omitted when an interface with a user or operator is not provided. Also, the medium driving device 1506 may be omitted when the information processing apparatus does not access the portable storage medium 1509.

While the disclosed embodiment and advantages thereof have been described in detail, a person skilled in the art will be able to make various changes, additions, and omissions without deviating from the scope of the present disclosure clearly described in the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention. For example, the steps recited in any of the method or process descriptions may be executed in any order and are not limited to the order presented.

What is claimed is:

1. An apparatus for image coding, the apparatus comprising:
    a memory; and
    a processor coupled to the memory and configured to
    execute a determining process that includes
        when a specific entry included in a first palette for use in coding a first block in a coding-target image is not an entry candidate for a second palette for use in coding a second block to be coded after the first block, determining an entry to be included in the second palette based on a first index and a second index, the first index indicating a code amount to be generated when the specific entry is to be included in the second palette, the second index indicating a code amount to be generated when the specific entry is not to be included in the second palette,
    execute a generating process that includes generating the second palette including the entry determined in the determining process, and
    execute a palette coding process that includes coding the second block by using the second palette,
    wherein the determining process is configured to
        determine that the specific entry is to be included in the second palette when the code amount indicated by the second index is greater than the code amount indicated by the first index,
        determine that the specific entry is not to be included in the second palette when the code amount indicated by the second index is equal to or less than the code amount indicated by the first index.

2. The apparatus according to claim 1,
    wherein the determining process includes finding, based on the pixel value distribution, a probability of occurrence that a pixel value corresponding to the specific entry occurs in a third block to be coded after the second block, finding the first index and the second index based on the probability of occurrence, and determining that the specific entry is to be included in the second palette when the code amount indicated by the second index is larger than the code amount indicated by the first index.

3. The apparatus according to claim 1, wherein the processor is configured to execute an analyzing process, the analyzing process including analyzing pixel values of the coding-target image and generating pixel value distribution information representing the pixel value distribution, and wherein the determining process includes finding the first index and the second index by using the pixel value distribution information.

4. The apparatus according to claim 1, wherein the processor is configured to execute an analyzing process, the analyzing process including analyzing pixel values of a plurality of blocks coded before the second block and pixel values of the second block and generating pixel value distribution information representing the pixel value distribution, and wherein the determining process includes finding the first index and the second index by using the pixel value distribution information.

5. The apparatus according to claim 2, wherein the code amount indicated by the second index includes a code amount for re-registering the specific entry in a third palette for use in coding the third block when the specific entry is not left on the second palette and a pixel value corresponding to the specific entry appears in the third block.

6. The apparatus according to claim 1, wherein the first index and the second index are calculated based on a pixel value distribution of the coding-target image.

7. A method for image coding, the method comprising:

executing, by a processor, a determining process that includes, when a specific entry included in a first palette for use in coding a first block in a coding-target image is not an entry candidate for a second palette for use in coding a second block to be coded after the first block, determining an entry to be included in the second palette based on a first index and a second index, the first index indicating a code amount to be generated when the specific entry is to be included in the second palette, the second index indicating a code amount to be generated when the specific entry is not to be included in the second palette;

executing, by a processor, a generating process that includes generating the second palette including the entry determined in the determining process; and executing, by a processor, a palette coding process that includes coding the second block by using the second palette, wherein the determining process is configured to determine that the specific entry is to be included in the second palette when the code amount indicated by the second index is greater than the code amount indicated by the first index, determine that the specific entry is not to be included in the second palette when the code amount indicated by the second index is equal to or less than the code amount indicated by the first index.

8. The method according to claim 7, wherein the determining process includes finding, based on the pixel value distribution, a probability of occurrence that a pixel value corresponding to the specific entry occurs in a third block to be coded after the second block, finding the first index and the second index based on the probability of occurrence, and determining that the specific entry is to be included in the second palette when the code amount indicated by the second index is larger than the code amount indicated by the first index.

9. The method according to claim 7, further comprising:

executing an analyzing process that includes analyzing pixel values of the coding-target image and generating pixel value distribution information representing the pixel value distribution, wherein the determining process includes finding the first index and the second index by using the pixel value distribution information.

10. The method according to claim 7, further comprising:

executing an analyzing process that includes analyzing pixel values of a plurality of blocks coded before the second block and pixel values of the second block and generating pixel value distribution information representing the pixel value distribution, wherein the determining process includes finding the first index and the second index by using the pixel value distribution information.

11. The method according to claim 8, wherein the code amount indicated by the second index includes a code amount for re-registering the specific entry in a third palette for use in coding the third block when the specific entry is not left on the second palette and a pixel value corresponding to the specific entry appears in the third block.

12. The method according to claim 7, wherein the first index and the second index are calculated based on a pixel value distribution of the coding-target image.

13. A non-transitory computer-readable storage medium storing a program that causes a computer to execute a process, the process comprising:

executing a determining process that includes, when a specific entry included in a first palette for use in coding a first block in a coding-target image is not an entry candidate for a second palette for use in coding a second block to be coded after the first block, determining an entry to be included in the second palette based on a first index and a second index, the first index indicating a code amount to be generated when the specific entry is to be included in the second palette, the second index indicating a code amount to be generated when the specific entry is not to be included in the second palette;

executing a generating process that includes generating the second palette including the entry determined in the determining process; and executing a palette coding process that includes coding the second block by using the second palette, wherein the determining process is configured to determine that the specific entry is to be included in the second palette when the code amount indicated by the second index is greater than the code amount indicated by the first index, determine that the specific entry is not to be included in the second palette when the code amount indicated by the second index is equal to or less than the code amount indicated by the first index.

14. The non-transitory computer-readable storage medium according to claim 13,
wherein the determining process includes
finding, based on the pixel value distribution, a probability of occurrence that a pixel value corresponding to the specific entry occurs in a third block to be coded after the second block,
finding the first index and the second index based on the probability of occurrence, and
determining that the specific entry is to be included in the second palette when the code amount indicated by the second index is larger than the code amount indicated by the first index.

15. The non-transitory computer-readable storage medium according to claim 13,
wherein the process further includes executing an analyzing process that includes analyzing pixel values of the coding-target image and generating pixel value distribution information representing the pixel value distribution,
wherein the determining process includes finding the first index and the second index by using the pixel value distribution information.

16. The non-transitory computer-readable storage medium according to claim 13,
wherein the process further includes executing an analyzing process that includes analyzing pixel values of a plurality of blocks coded before the second block and pixel values of the second block and generating pixel value distribution information representing the pixel value distribution, and
wherein the determining process includes finding the first index and the second index by using the pixel value distribution information.

17. The non-transitory computer-readable storage medium according to claim 14,
wherein the code amount indicated by the second index includes a code amount for re-registering the specific entry in a third palette for use in coding the third block when the specific entry is not left on the second palette and a pixel value corresponding to the specific entry appears in the third block.

18. The non-transitory computer-readable storage medium according to claim 13,
wherein the first index and the second index are calculated based on a pixel value distribution of the coding-target image.

* * * * *